United States Patent
McCombs et al.

(10) Patent No.: US 6,935,612 B2
(45) Date of Patent: Aug. 30, 2005

(54) SOLENOID VALVE

(75) Inventors: Norman R. McCombs, Tonawanda, NY (US); Michael R. Valvo, East Aurora, NY (US)

(73) Assignee: AirSep Corporation, Buffalo, NY (US)

( * ) Notice: Subject to any disclaimer, the term of this patent is extended or adjusted under 35 U.S.C. 154(b) by 38 days.

(21) Appl. No.: 10/442,522

(22) Filed: May 21, 2003

(65) Prior Publication Data

US 2004/0232372 A1 Nov. 25, 2004

(51) Int. Cl.[7] ............................................... F16K 31/02
(52) U.S. Cl. .................... 251/129.15; 251/64; 335/257; 335/277
(58) Field of Search .............................. 251/64, 129.15; 335/257, 271, 277

(56) References Cited

U.S. PATENT DOCUMENTS

| | | | | |
|---|---|---|---|---|
| 4,185,722 A | * | 1/1980 | Palmer et al. | 192/18 B |
| 4,522,372 A | * | 6/1985 | Yano et al. | 251/129.15 |
| 4,582,294 A | * | 4/1986 | Fargo | 251/129.15 |
| 4,671,488 A | * | 6/1987 | Zeuner et al. | 251/118 |
| 4,753,416 A | * | 6/1988 | Inagaki et al. | 251/129.15 |
| 5,565,832 A | * | 10/1996 | Haller et al. | 335/249 |

* cited by examiner

*Primary Examiner*—Edward K. Look
*Assistant Examiner*—John K. Fristoe, Jr.
(74) *Attorney, Agent, or Firm*—Hiscock & Barclay, LLP

(57) ABSTRACT

The solenoid valve of the present invention includes an armature with a protrusion and a plug nut with a recess for receiving the protrusion. The protrusion includes a polymer o-ring. The protrusion is configured such that it slides freely within the recess. The o-ring contacts the plug nut to prevent further motion of the armature toward the plug nut after the protrusion has entered the recess.

14 Claims, 5 Drawing Sheets

SOLENOID VALVE

FIELD OF THE INVENTION

This invention relates to solenoid valves.

BACKGROUND OF THE INVENTION

Conventional solenoid valves include a moveable armature and a stationary plug nut as shown in FIG. 1. A wire coil encloses the valve on the plug nut side and an external spring biases the armature against a valve seat. An electric current running through the wire coil creates a magnetic field that forces the armature against the external spring until the armature contacts the plug nut. A rubber pad is commonly glued into the recess of the plug nut to reduce wear of the armature and the plug nut. When the rubber pad must be replaced due to wear, the solenoid valve must be disassembled. Further, the heat generated by the electrical current through the coil degrades the glue used to affix the rubber pad to the plug nut. Even further, the rubber pad does not provide a proper surface for a biasing spring to abut against. Thus conventional solenoid valves require inefficient external springs.

Therefore, a solenoid valve controlling the flow of a fluid such as a gas and having an easily replaceable interface between the armature and the plug nut is desired in the art.

Further, a solenoid valve that is quiet in operation and resistant to the effects of heat is desired in the art.

SUMMARY OF THE INVENTION

The invention comprises, in one form thereof, a substantially cylindrical outer casing having an open end and a closed end and a threaded adaptor affixed to or integral with the open end of the outer casing. A ferrous metal plug nut is positioned within the outer casing and abuts the closed end of the outer casing. The plug nut includes a recess facing away from the closed end of the outer casing. A fluid passage is provided adjacent to the open end of the outer casing and includes a valve seat. According to the invention an armature is positioned within the outer casing and includes a first end proximate to the open end of the outer casing and a second end proximate to the recess of the plug nut. An o-ring is positioned on the second end. The o-ring, which is configured for being the contact point between the armature and the plug nut, significantly reduces the noise level during movement of the armature. A protrusion supporting the o-ring is slidable within the recess of the plug nut. A spring engages the armature and is configured for biasing the piston head against the valve seat of the fluid passage in the valve closed position.

An advantage of the present invention is that the solenoid valve includes an o-ring that provides an easily replaceable interface and uniform pressure point between the armature and the plug nut. Further, the o-ring is a standard size and is therefore readily available.

A further advantage of the present invention is that the o-ring is not glued into place, and therefore the solenoid valve is resistant to the effects of heat.

An even further advantage of the present invention is that the solenoid valve includes an internal biasing spring.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein.

Corresponding reference characters indicate corresponding parts throughout the several views. The exemplifications set out herein illustrate the preferred embodiments of the invention and such exemplifications are not to be construed as limiting the scope of the invention in any manner.

DETAILED DESCRIPTION

Figure 1:
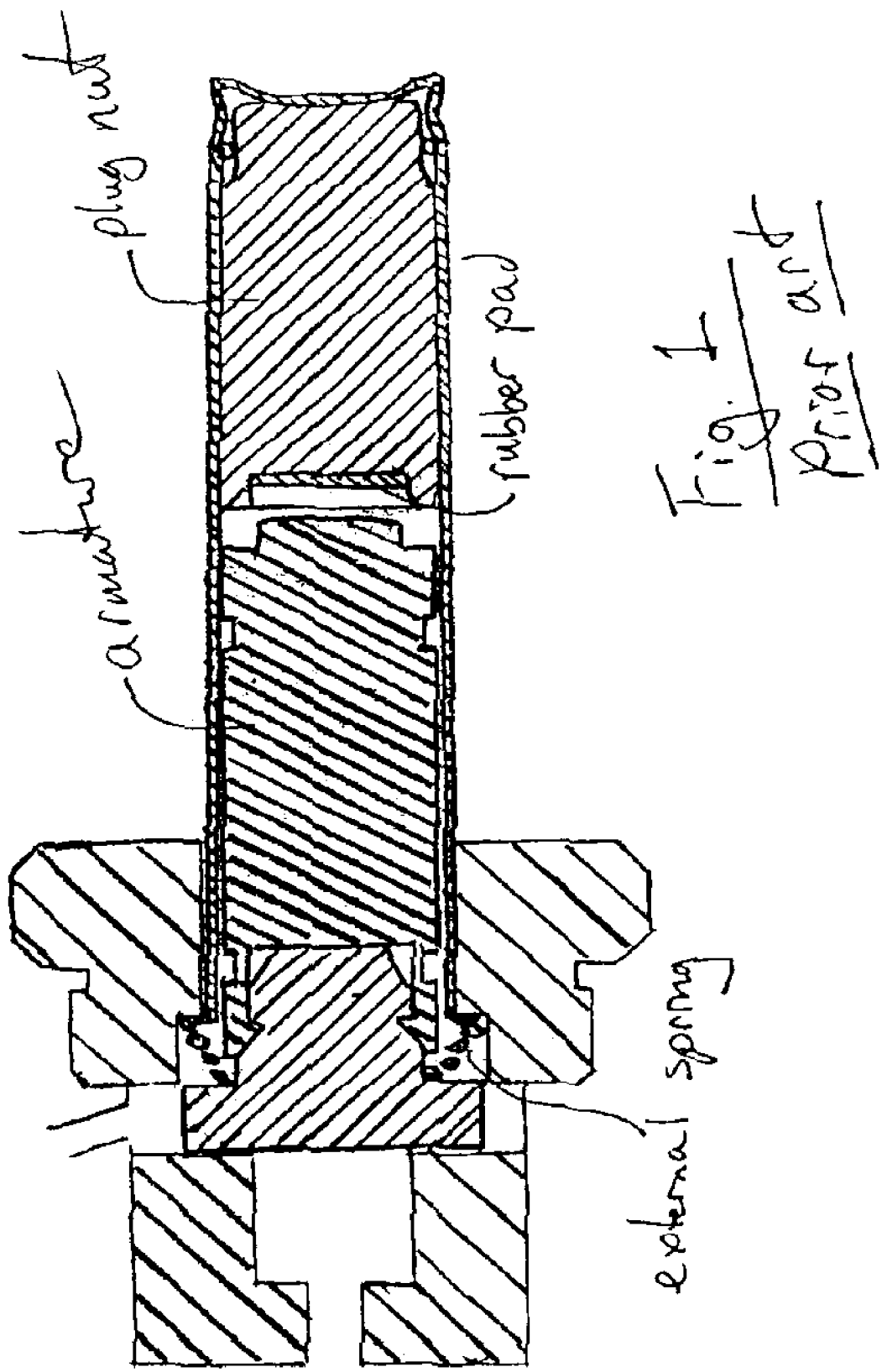
FIG. 1 is a cross-sectional view of a conventional solenoid valve according to the prior art.
Figure 2:
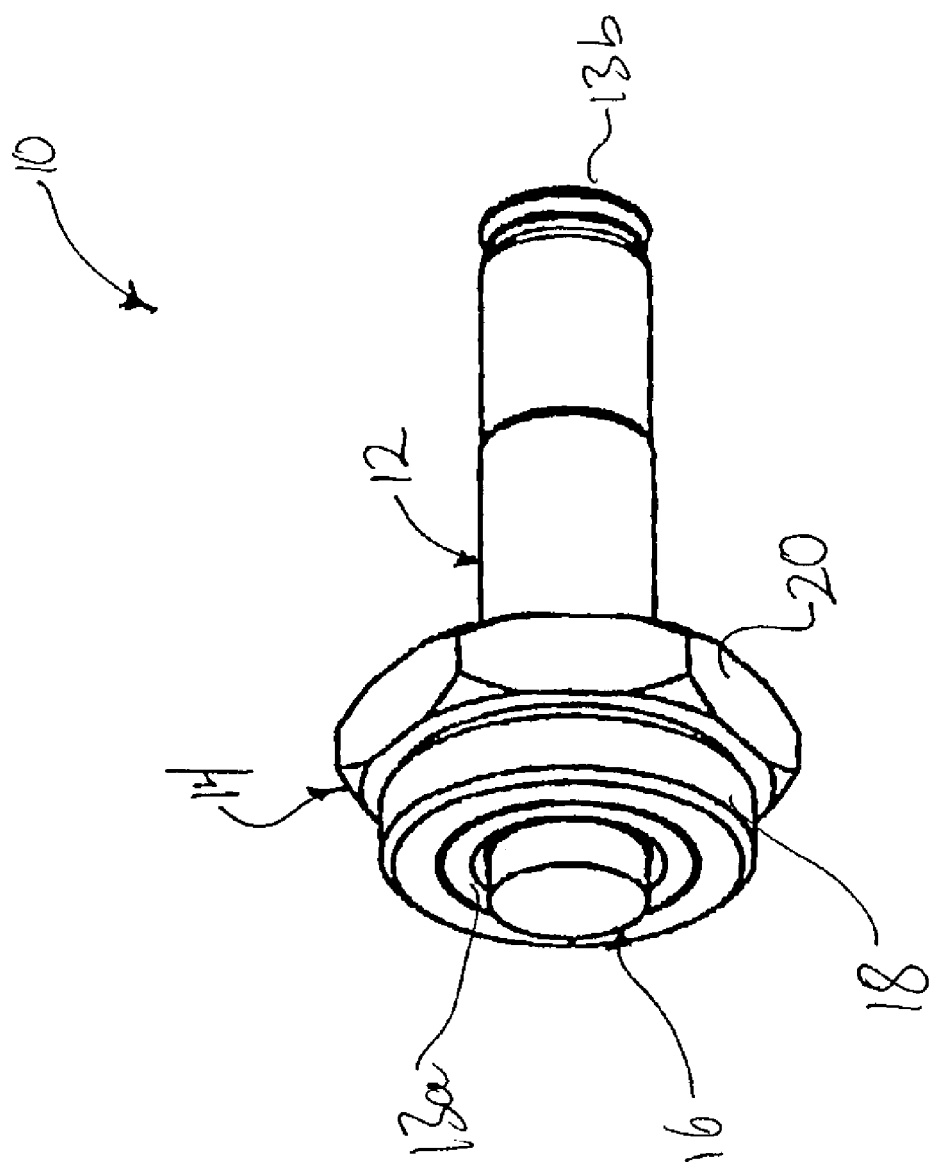
FIG. 2 is an isometric view of the solenoid valve of the present invention.

Referring to FIG. 2, there is shown the solenoid valve of the present invention. The solenoid valve 10 includes an outer casing 12, a threaded adapter 14, and an armature assembly 16.

The outer casing 12 encases the armature assembly 16 and is made of a rigid material such as brass or stainless steel. The outer casing 12 includes an open end 13a and a closed end 13b retaining plug nut member 28. The threaded adapter 14 is made of brass or plated steel. The inner surface of the threaded adapter 14 is affixed to the outer surface of the outer casing 12 at the open end 13a. The threaded adapter 14 includes a threaded outer surface 18 and a hex head 20. A solenoid coil assembly 21 (shown in FIG. 3) is mounted over the outer casing 12, between the hex head 20 and the closed end 13b.

Figure 3:
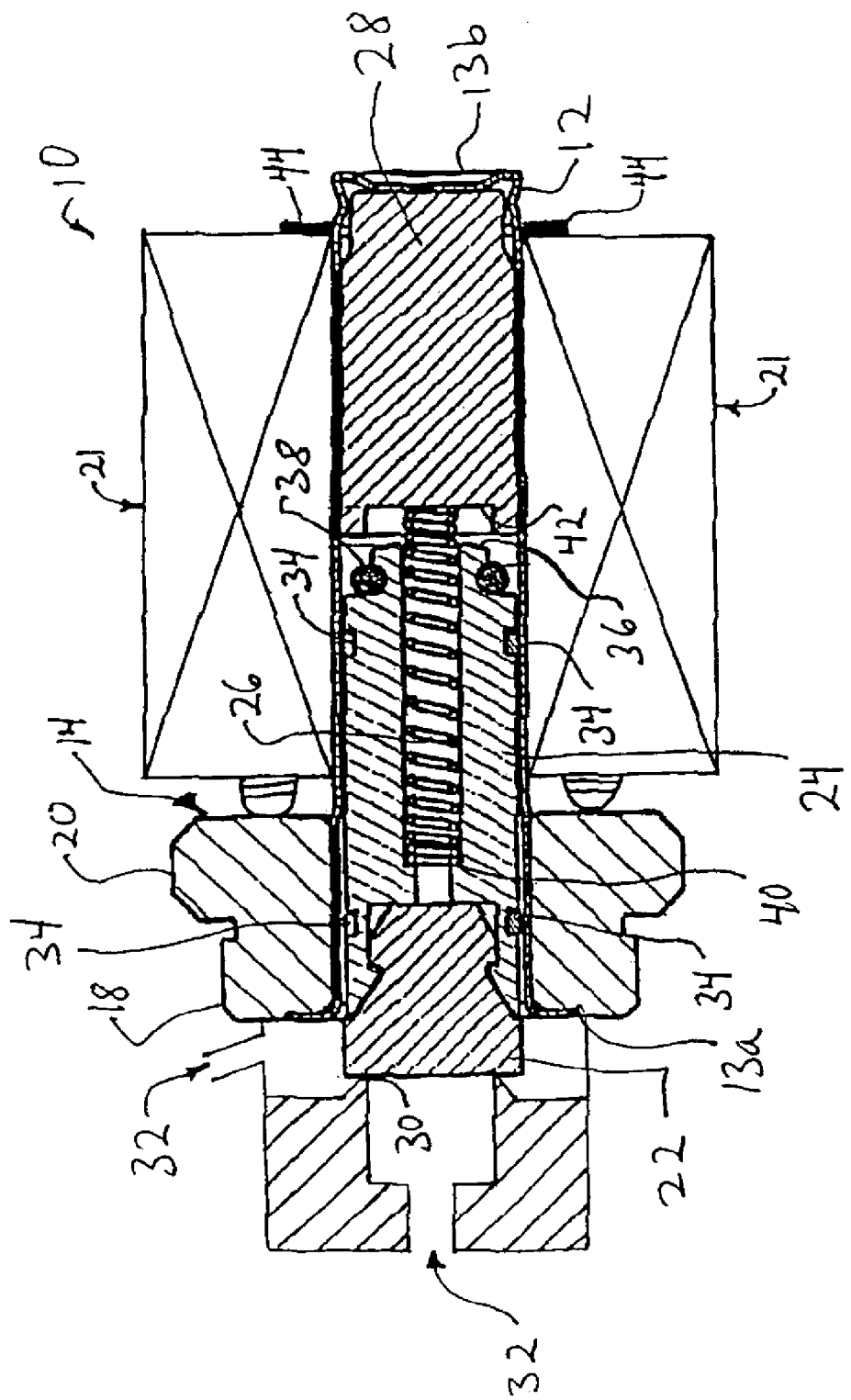
FIG. 3 is a cross-sectional view of the solenoid valve of FIG. 2 in the closed position.

The armature assembly, as best shown in FIG. 3, includes a BUNA-N rubber piston head 22, an armature member 24, a compression spring 26, and a plug nut 28. The piston head 22 is configured with a flat end for engaging the valve seat 30 and is affixed to one end of the armature 24. The piston head 22 blocks the fluid passage 32 when in contact with the valve seat 30 as shown in FIG. 3. The armature 24 is made of a ferrous metal and is slidable within the outer casing 12. The armature 24 includes two radial grooves, each configured for receiving a flat ring 34. In the preferred embodiment, the flat rings 34 are made of a fluoropolymer resin such as those sold under the trademark TEFLON. The flat rings 34 have an outer diameter that is slightly larger than the outer diameter of the armature 24 when placed in the radial grooves such that the flat rings 34 engage the inner surface of the outer casing 12. Therefore there is substantially no metal to metal contact between the armature 24 and the outer casing 12. The end of the armature 24 opposite to the piston head 22 includes a protrusion 36. The protrusion 36 includes a radial groove for receiving an o-ring 38. In the preferred embodiment, the o-ring 38 is made of a fluoroelastomer such as those sold under the trademark VITON. The armature 24 further includes an axial bore with a spring seat 40 for receiving the compression spring 26.

Figure 4:
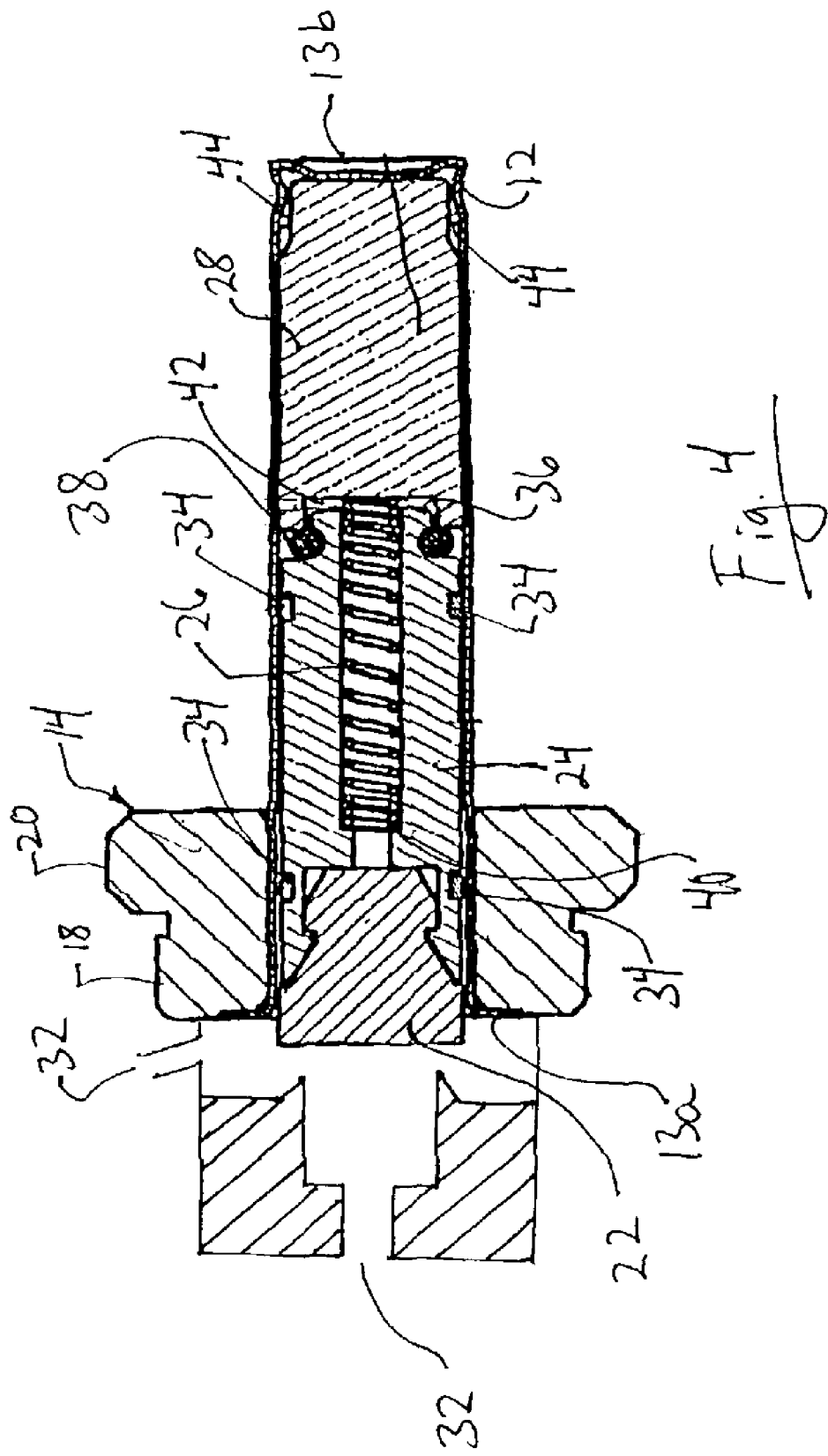
FIG. 4 a cross-sectional view of the solenoid valve of FIG. 2 in the open position.

The plug nut 28 is made of a ferrous metal and butts against the closed end 13b of the outer casing 12. The plug nut 28 includes a recess 42 configured for receiving the protrusion 36 of the armature 24. Referring now to FIG. 4, the recess 42 has a diameter that is slightly larger than the diameter of the protrusion 36 such that the protrusion 36 slides freely within the recess 42. Further, the recess 42 is deeper than the distance from the o-ring 38 to the end surface of the protrusion 36 such that the o-ring 38 stops motion of the armature 24 in the direction of the plug nut 28. When the solenoid valve 10 is in the fully open position there is a clearance between the end surface of the protrusion 36 and the recess 42. The closed end 13b of the outer casing 12 is crimped such that the plug nut 28 remains abutted against the closed end 13b. A retaining ring 44 holds the solenoid coil assembly 21 in position. The annular surface of the plug nut 28 surrounding the recess 42 and engaging the o-ring 38 may be squared, rounded, or chamfered.

In use, the solenoid valve 10 is biased in the closed position by the compression spring 26 such that the piston head 22 engages the valve seat 30. When actuated, an electric current flows through the solenoid coil 21 thereby magnetizing the armature 24 and the plug nut 28. The magnetic force between the armature 24 and the plug nut 28 causes the armature 24 to move against the compression spring 26 toward the plug nut 28. The motion of the armature 24 is stopped when the o-ring 38 engages the end of the plug nut 28. Now, the piston head 22 is off the valve seat 30 and the fluid passage 32 is open. This state is maintained until the electric current through the solenoid coil is de-actuated. When de-actuated, the magnetic force between the armature 24 and the plug nut 28 is significantly reduced, thus the compression spring 26 forces the armature 24 away from the plug nut 28 until the piston head 22 engages the valve seat 30.

It should be particularly noted that because o-rings are accurately specified to provide a uniform pressure against the plug nut 28 and easy to replace, proper and quiet functioning of solenoid valve 10 is easily maintained. Further, it is a significant advantage of the invention that the easily replaceable o-ring 38 is subjected to wear while the armature 24 and the plug nut 28 are subjected to significantly less wear. This is due to the fact that it is the o-ring 38 that impacts the plug nut 28 in operation, not the armature 24. Since the o-ring 38 is softer than the plug nut 28, the o-ring 38 will wear before the plug nut 28, which is significantly more difficult to replace.

Figure 5:
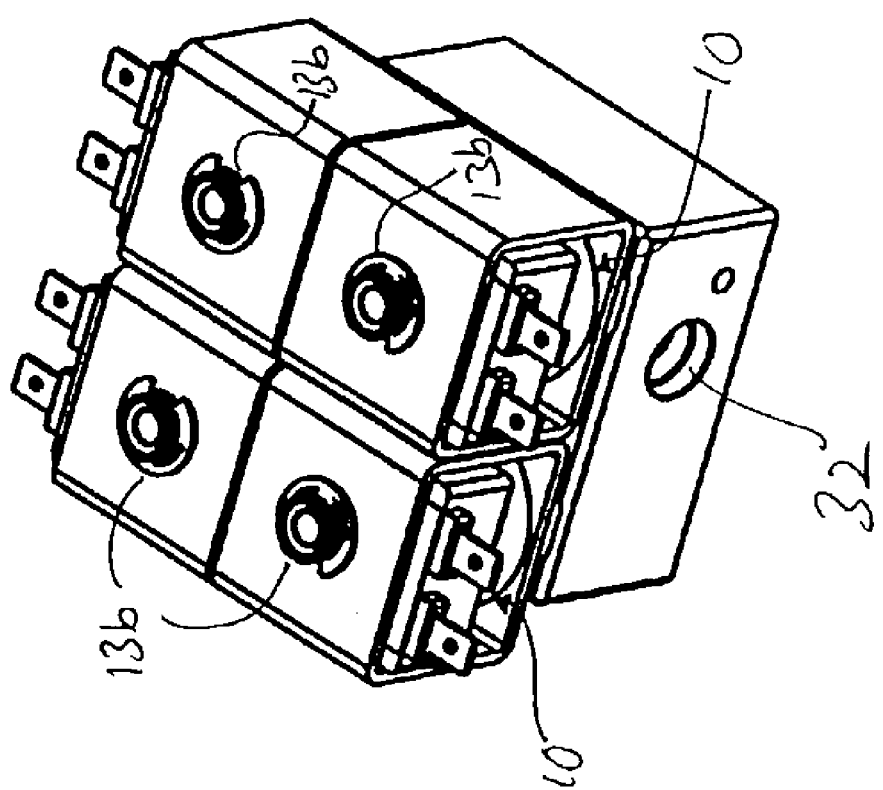
FIG. 5 is an isometric view of a valve block assembly including four solenoid valves of the present invention.

The solenoid valves 10 may be arranged in blocks of 2 or more. A block of four solenoid valves 10 is shown in FIG. 5.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

What is claimed is:

1. A solenoid valve, comprising:
an outer casing having an open end and a closed end;
a plug nut positioned within said outer casing, said plug nut abutting the closed end of said outer casing and including a recess opposite the closed end;
a fluid passage adjacent to the open end of said outer casing, said fluid passage having a valve seat;
an armature positioned within said outer casing, said armature having a first end proximate to the open end of said outer casing, a second end having a protrusion proximate to said plug nut and at least partially slidable into the recess;
an o-ring positioned on the second end of said armature to engage the plug nut when the valve is in an open position; and
a spring engaging said armature to bias the armature away from the plug nut, wherein said o-ring is positioned on said protrusion of said armature and is configured for limiting the distance said protrusion is slidable within the recess of said plug nut.

2. The solenoid valve of claim 1, further comprising a threaded adaptor affixed to or integral with the open end of said outer casing, said threaded adaptor having a threaded outer surface and a hex head.

3. The solenoid valve of claim 1, wherein said plug nut is made of a soft metal.

4. The solenoid valve of claim 1, further comprising a piston head affixed to or integral with the first end of said armature, said piston head configured for engaging the valve seat of said fluid passage to block said fluid passage, and said spring configured for biasing said piston head against the valve seat of said fluid passage.

5. A solenoid valve, comprising:
an outer casing having an open end and a closed end;
a plug nut positioned within said outer casing, said plug nut abutting the closed end of said outer casing;
a fluid passage adjacent to the open end of said outer casing, said fluid passage having a valve seat;
an armature positioned within said outer casing, said armature having a first end proximate to the open end of said outer casing, a second end proximate to said plug nut;
an o-ring positioned on the second end of said armature to engage the plug nut when the valve is in an open position;
a spring engaging said armature to bias the armature away from the plug nut; and
wherein said plug nut includes a recess facing away from the closed end of said outer casing.

6. The solenoid valve of claim 5, further comprising a protrusion integral with or affixed to the second end of said armature, said protrusion being slidable within the recess of said plug nut.

7. The solenoid valve of claim 6, wherein said armature and said plug nut are substantially cylindrical in shape and said armature is in line with said plug nut.

8. The solenoid valve of claim 7 wherein said armature includes a piston head.

9. The solenoid valve of claim 8, wherein the piston head is configured to engage the valve seat of said fluid passage thereby blocking said fluid passage.

10. The solenoid valve of claim 9, wherein the spring is configured to bias the piston head of said armature against the valve seat of said fluid passage.

11. The solenoid valve of claim 10, wherein said armature includes a central recess and the spring substantially is located within said recess at one end and engages said plug nut at its other end.

12. A solenoid valve, comprising:
a plug nut member;
an armature member being substantially in line with said plug nut member and having an open position and a closed position by movement in an axial direction;

spring means biasing the armature member in one of said positions;

one of said members defining a protrusion and the other member defining a recess at least partially receiving the protrusion when the armature member is in one of said positions;

means defining a fluid passage adjacent to said armature member and having a valve seat engaged by the armature member when in the closed position and spaced from the armature when in the open position; and an o-ring positioned on the one of said members to engage the other member when in the position in which the protrusion is received by the recess, while preventing the one member from otherwise being in physical contact with the other member.

13. The solenoid valve of claim 12, wherein said plug nut member includes the recess, the armature member includes the protrusion, and the protrusion is slidable within the recess against the spring means when the armature member is in the open position.

14. The solenoid valve of claim 12, wherein said plug nut member includes the recess, the armature member includes the protrusion, and the o-ring is mounted on the protrusion and engages the plug nut member when the protrusion enters the recess.

* * * * *